United States Patent
Siemer et al.

(10) Patent No.: US 7,392,976 B2
(45) Date of Patent: Jul. 1, 2008

(54) SWITCHABLE HYDRAULICALLY DAMPING BUSH BEARING

(75) Inventors: Hubert Siemer, Dinklage (DE); Josef Burwinkel, Dinklage (DE); Stefan Loheide, Wallenhorst (DE); Burkhard Meyer, Dinklage (DE)

(73) Assignees: ZF Friedrichshafen AG, Friedrichshafen (DE); Audi AG, Ingolstadt (DE)

( * ) Notice: Subject to any disclaimer, the term of this patent is extended or adjusted under 35 U.S.C. 154(b) by 0 days.

(21) Appl. No.: 10/596,517

(22) PCT Filed: Dec. 9, 2004

(86) PCT No.: PCT/DE2004/002697

§ 371 (c)(1),
(2), (4) Date: Jan. 31, 2007

(87) PCT Pub. No.: WO2005/059399

PCT Pub. Date: Jun. 30, 2005

(65) Prior Publication Data

US 2007/0273073 A1  Nov. 29, 2007

(30) Foreign Application Priority Data

Dec. 16, 2003  (DE) .............................. 103 59 343

(51) Int. Cl.
*F16F 7/00* (2006.01)
(52) U.S. Cl. .............................. 267/140.12; 267/140.14
(58) Field of Classification Search . 267/140.11–141.7; 248/562, 566
See application file for complete search history.

(56) References Cited

U.S. PATENT DOCUMENTS

| 5,139,241 | A | 8/1992 | Hamaekers et al. |
| 5,246,213 | A | 9/1993 | Zup et al. |
| 6,527,261 | B2 * | 3/2003 | Breitfeld et al. ........ 267/140.13 |
| 6,561,501 | B2 | 5/2003 | Bouhier et al. |
| 2002/0020950 | A1 | 2/2002 | Bouhier et al. |

FOREIGN PATENT DOCUMENTS

| DE | 69101803 | 11/1994 |
| DE | 10029267 | 1/2001 |
| DE | 10029268 | 1/2001 |
| DE | 10118229 | 11/2002 |
| DE | 10121399 | 11/2002 |
| EP | 0173273 | 3/1986 |
| EP | 0452169 | 10/1991 |
| JP | 61248934 | 11/1986 |

* cited by examiner

Primary Examiner—Christopher P Schwartz
(74) Attorney, Agent, or Firm—McGlew & Tuttle, P.C.

(57) ABSTRACT

A hydraulically damping bush bearing is provided with hydraulic area formed from at least two chamber pairs, wherein each chamber pair is formed from at least two separate chambers, which are connected to one another via at least one damping channel. The hydraulically damping bearing with damping in both the axial direction and the radial direction is further improved to the effect that damping or stiffness that can be switched off or on depending on the operating state is also made possible. The hydraulically damping bush bearing (1) chambers (19, 20; 22, 23) of the chamber pairs (21, 24) can be connected via a closable chamber wall opening (40).

28 Claims, 5 Drawing Sheets

оf the invention is to further improve a

SWITCHABLE HYDRAULICALLY DAMPING BUSH BEARING

CROSS REFERENCE TO RELATED APPLICATIONS

This application is a United States National Phase application of International Application PCT/DE 2004/002697 and claims the benefit of priority under 35 U.S.C. § 119 of German Patent Application DE 103 59 343.8 filed Dec. 16, 2003, the entire contents of which are incorporated herein by reference.

FIELD OF THE INVENTION

The present invention pertains to a hydraulically damping bush bearing, a so-called hydraulic bearing, in which the hydraulic area is formed from at least two chamber pairs, wherein each chamber pair is formed from at least two separate chambers, which are connected to one another via at least one damping channel.

BACKGROUND OF THE INVENTION

To damp vibrations and to absorb forces, bearings of a great variety of designs, mainly rubber bearings, are used in many different ways. In automotive engineering, they are used, for example, to mount parts of the wheel suspension or the drive assemblies of vehicles. It is known that depending on the application, the damping action of elastomeric damping members is additionally supported by hydraulic damping. To utilize the amortizing effect caused by the weight of liquid, chambers are provided in the elastomeric insert parts or rubber bodies of the chamber to receive a fluid damping agent. The chambers, whose size and position in the bearing depends on the required tuning, are connected to one another in a flow-carrying manner by one or more special channels, which are formed in special moldings that are additionally integrated in the bearing. Depending on the stress on the bearing, the damping agent is thus pressed from one chamber into another. Both bearings in which the hydraulic damping is used in respect to forces introduced radially into the bearing and bearings in which mainly the axial damping is supported by the damping liquid are known in this connection. Bearings in which the amortizing effect of the damping agent in the axial and radial directions is utilized are known as well.

Such a bearing, in which an elastomeric damping member is arranged between an inner part and an outer sleeve, is known from DE 691 01 803 T2. A first, fluid-filled chamber pair is arranged within the elastomeric damping member, and the two chambers belonging to it are located at the opposite ends of the bearing and frequency-dependent damping is brought about in the axial direction of the bearing. A second chamber pair with radially opposite chambers, which is provided for the radial damping, is arranged between this first chamber pair in the elastomeric damping member. The axially acting and the radially acting chambers are connected to one another via damping channels arranged in a channel carrier provided in the interior of the inner part. An essential drawback of this embodiment is the arrangement of the channel carrier in the interior of the inner part, as a result of which the damping channels, and consequently the damping characteristic can be varied to a very limited extent only. Moreover, the chambers of the respective chamber pairs as well as the chamber of the first chamber pair and that of the second chamber pair are arranged such that they are separated very far from one another in space.

Furthermore, hydraulically damping bearings with two chambers acting in one direction are known, in which the two chambers filled with hydraulic fluid can be connected to one another directly via a closable and releasable chamber wall opening, besides the connection via a damping channel, for a damping or stiffness that can be switched off or on depending on the operating state. Such a bearing is known, for example, from EP 0 173 273 A2, in which a chamber wall opening can be closed by a pneumatically controlled closing plate. The pneumatic cylinder acting as an actuating cylinder is arranged here outside the chambers and considerably increases the space needed for installing the bearing. Moreover, an additional sealing effort is necessary at the piston of the pneumatic cylinder, and this rather complicated arrangement is limited to two-chamber bearings.

SUMMARY OF THE INVENTION

The object of the present invention is to further improve a hydraulically damping bearing with damping in both the axial and radial directions to the effect that damping or stiffness that can be switched off or on depending on the operating state is also made possible, and the bearing has a simple and compact design and is able to be manufactured economically.

The bush bearing according to the present invention has an inner part with a hole extending along a longitudinal axis, wherein the inner part is surrounded by an outer sleeve and at least one elastomeric damping member is present between the inner part and the outer sleeve. Furthermore, the bush bearing comprises at least one first and one second chamber pair, wherein each chamber pair is formed from two separate chambers. The chambers of the first chamber pair are arranged axially along the longitudinal axis of the bush bearing and the two chambers of the second chamber pair are arranged radially in relation to the longitudinal axis as well as in the axial direction between the two chambers of the first chamber pair. The chamber pairs are connected via at least one damping chamber each, which is provided in a channel carrier arranged between the outer sleeve and an outer bush located on the outside. According to the present invention, at least one of the chambers of one chamber pair can be connected to at least one of the chambers of the second chamber pair via at least one chamber wall opening, which can be closed as desired, or the chambers of at least one of the chamber pairs can be connected via at least one chamber wall opening, which can be closed as desired, or at least one of the chambers of one chamber pair can be connected to at least one of the chambers of the second chamber pair via at least one chamber wall opening, which can be closed as desired, and the chambers of at least one of the chamber pairs can be connected via at least one other chamber wall opening, which can be closed as desired.

Due to the direct connection of the chambers of all chambers to one another as desired, it is now made possible to bring about damping or stiffness that can be switched off or on depending on the operating state in at least two directions in space. If only the chambers of one chamber pair are connected directly to one another through a chamber wall opening, only the high-frequency vibrations in one direction in space are isolated, whereas damping action continues to be present in the other direction in space. Thus, the different possibilities of connecting the chambers, which can be switched as desired, leads to switchability of the bush bearing, so that the switchability makes it possible to tune the bearing to different driving conditions.

The chamber wall openings are advantageously closed or opened as desired with a closing mechanism, which is formed from at least one closing element and an actuating device each. The closing element is preferably designed as a slide, which is actuated by an actuating device advantageously designed as an electromagnet. Besides the design as an electromagnet, the actuating device may also be actuated pneumatically, hydraulically or mechanically, for example by means of a pulling cable. To adapt the damping or stiffness characteristic of the bush bearing in one direction in space or in at least two directions in space to the different operating states, the actuating devices may be activated individually, in pairs or also in groups. It is possible as a result to connect greatly different chambers of the individual chamber pairs to one another, on the one hand, and, on the other hand, to vary the cross-sectional openings of the chamber wall openings for two chambers connected to one another for a further, variable tuning of the damping properties. For example, two chambers may be able to be connected via two adjacent and separately controllable chamber wall openings. In a preferred embodiment, an actuating device may also actuate two slides simultaneously, so that the effort can be reduced, on the whole, in case of a plurality of closable chamber wall openings.

The slides as well as the electromagnetic actuating device can also be accommodated in a very narrow space, so that it can be advantageously designed for a compact bearing. The arrangement of the closing mechanism, especially the actuating device, within at least one fluid-filled chamber is especially favorable, so that components arranged outside the bearing can be avoided.

According to another feature of the present invention, the chambers of the bush bearing are arranged such that the chambers of the first chamber pair and the chambers of the second chamber pair overlap at least in some areas in axial partial areas. Accordingly, both at least parts of chambers of the first chamber pair and chambers or parts of the chambers of the second chamber pair can be arranged one after another within a ring directed at right angles to the longitudinal axis along a circular line extending concentrically with the ring. Due to this arrangement, the volume needed for the chambers arranged at the axial ends can be displaced into areas toward the center of the bush bearing, namely, precisely into the areas that are usually filled by an elastomer. Thus, the present invention leads, on the one hand, to the embodiment of a very compact bush bearing, especially in the axial direction, and, on the other hand, large-volume elastomeric areas are avoided. Moreover, the amount of material used is substantially reduced in this manner concerning the elastomer, so that the cost can be considerably reduced. Moreover, the more compact design of the bush bearings creates the possibility of preparing more vulcanization nests in the vulcanization molds, so that a larger number of bush bearings can be manufactured per vulcanization operation.

To produce a stop for limiting the radial deflection of the inner part in relation to the outer sleeve, projections are arranged at the inner part of the bush bearing in an advantageous embodiment, as a result of which the chamber volume can also be affected in a simple manner.

The outer sleeve, which surrounds the inner part and the elastomeric damping member, is advantageously arranged at least in partial areas, at a spaced location from the outer bush and from a channel carrier arranged between the outer bush and the outer sleeve, so that the space present between the outer sleeve and the outer bush or the outer sleeve and the channel carrier can be used as a volume for the chambers of the first chamber pair, which are arranged at the axial ends of the bush bearing. Thus, this arrangement makes it possible to arrange the chambers of the first chamber pair and of the second chamber pair directly adjacent, only separated by a thin partition of the elastomeric damping member, not only in the axial direction, but they can also be arranged directly adjacent in a plane that is parallel to the longitudinal axis. The chambers of the first and second chamber pairs are separated in this case by the fixed wall of the outer sleeve as well as optionally by a layer of the elastomeric damping member. At least one chamber of the first chamber pair directly adjoins a chamber of the second chamber pair in a plane inclined at a right angle in relation to the longitudinal axis.

To separate the chambers of the first chamber pair, which are arranged at the axial ends of the bush bearing, the outer sleeve may be provided, in a preferred embodiment, with a web, which connects the outer sleeve to the channel carrier or the outer bush. If the channel carrier or the outer bush has a cylindrical design, the web is designed in the form of a segment of a circle. This web separates the chambers of the first chamber pair, which are arranged at the axial ends of the bush bearing. Thus, the chambers of the first chamber pair are also arranged directly adjacent to one another and are separated by a web only. They adjoin each other.

The damping member may advantageously have a two-part design, the two parts of the damping member forming in their contact area a parting plane, which is directed at right angles to the longitudinal axis of the bush bearing. Due to this division of the damping member, pretension can advantageously be achieved within the two-part damping member in the axial direction. The pretension is maintained via the outer sleeve, and the outer sleeve may likewise be designed as a two-part sleeve for this purpose in a preferred embodiment. The two parts of the outer sleeve now form, in their contact area, a contact zone, which extends through the entire web. The web is thus also of a two-part design. The contact zone of the outer sleeve and the parting plane of the two parts of the damping member are located in a common plane. Due to the two-part design of the damping member and of the outer sleeve, simplified manufacture of the bush bearing is also achieved, moreover, in terms of improved assembly and vulcanization conditions.

In a second preferred embodiment, the web connecting the outer sleeve to the outer bush or to the channel carrier may be designed as an additional element, which is fastened to the outer sleeve, for example, by means of a screw connection. A fastening plate with holes is arranged for this purpose at the additional element at right angles to the web, and this fastening plate may be made, for example, in one piece with the web. The manufacture of the bush bearing can be further simplified by means of this additional element, and, moreover, pretensioning (or compressing) of the two parts of the elastomeric damping member can be advantageously applied in a specific manner and permanently maintained.

The channel carrier, in which the damping channels connecting the chambers are formed, is especially advantageously arranged between the outer sleeve and the outer bush. Due to the relatively large diameter of the channel carrier, it is possible to vary the different damping channels in many different ways in order to thus achieve a substantially greater shift of the effective frequency band. The frequency positions and the values of the damping maxima can be set separately by means of the separate damping channels for the first chamber pair and the second chamber pair. If, moreover, the channel carrier extends over the entire axial extension of the outer bush in a preferred embodiment, effective mechanical support of the outer bush is, moreover, achieved, because the channel carrier can absorb part of the acting forces. The outer bush can thus be designed as a whole for lower loads.

It may be advantageous for the manufacturing effort and the design effort as well as for the use-related properties if the bush bearing as a whole as well as the individual components, especially the inner part, the parts of the outer sleeve and the parts of the elastomeric damping member are made symmetrical in relation to one another. For example, a damping characteristic tuned predominantly in two directions in space can be obtained especially by the symmetrical design of the chambers of the chamber pairs. The symmetry is related here to two planes, which extend at right angles to one another and within which the longitudinal axis of the bush bearing extends, as well as to a plane extending at right angles to the longitudinal axis of the bush bearing.

The symmetric design of the bush bearing facilitates, moreover, the manufacture of a series of hydraulic bearings according to a modular system. For example, a large number of bush bearings with different damping properties adapted to the particular requirements can be created for an outer bush with a fixed external diameter by selecting different inner components, for example, channel carrier, inner part or outer sleeve.

In another advantageous embodiment, at least the additional element can be designed together with the actuating device and with the closing element as a preassembled module, as a result of which the manufacturing effort can be further reduced.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings in particular, FIGS. 1 through 4 show a first exemplary embodiment of a bush bearing 1 according to the present invention. The bush bearing 1 has a preferably metallic inner part 2, for example, one consisting of aluminum, with a cylindrical through hole 3 along the longitudinal axis 4 of the bush bearing 1, wherein the hole 3 may also assume any other shape, for example, that of a hexagon socket, and may be designed, for example, as a blind hole. The inner part 2 is provided in a middle area of the bush bearing 1 with two radially opposite and radially outwardly extending projections 5, wherein the inner part 2 is surrounded by a two-part elastomeric damping member 6. The elastomeric damping member 6 comprising an upper damping part 7 and a lower damping part 8 and is vulcanized to the inner part 2. This construction represents two thrust or thrust-compression assemblies, which are arranged within a two-part outer sleeve 9 and are likewise vulcanized to same. The upper and lower outer sleeve parts 10, 11 compress the damping parts 7, 8 and apply a pretension to the elastomeric damping part 6. The outer sleeve 9 is surrounded by an outer bush 12, and a cylindrical channel carrier 13 is arranged between the outer bush 12 and the outer sleeve 9.

A conical rubber bearing 14 is pressed onto the inner part at each of the axial end areas by means of an inner support ring 15. The rubber bearing 14 is inserted into the outer bush 12 or the channel carrier 13 by means of a support ring 16, for example, by press fit.

Figure 1:
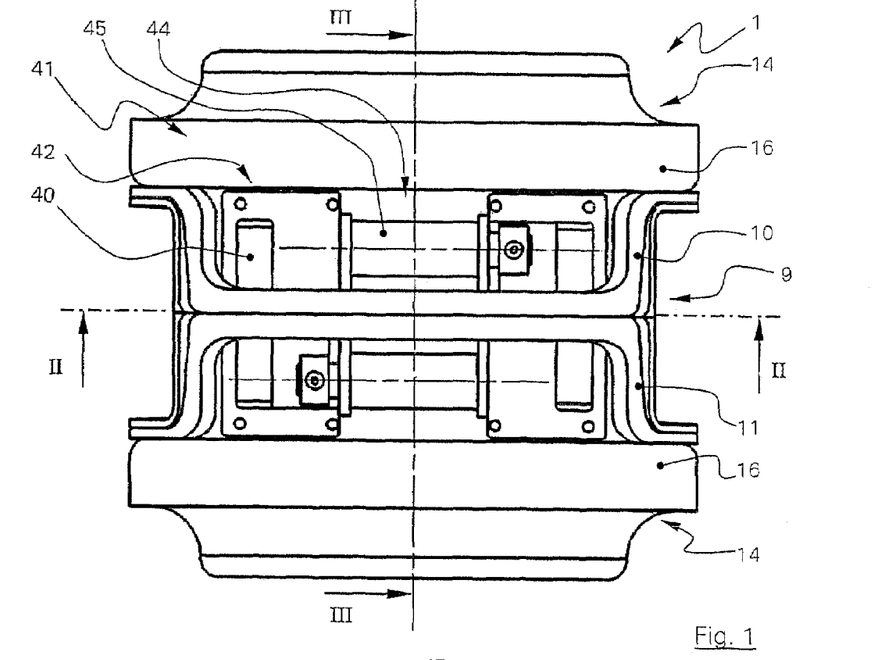
FIG. 1 is a side view of a first embodiment of the bush bearing according to the present invention without outer sleeve and channel carrier.
Figure 2:
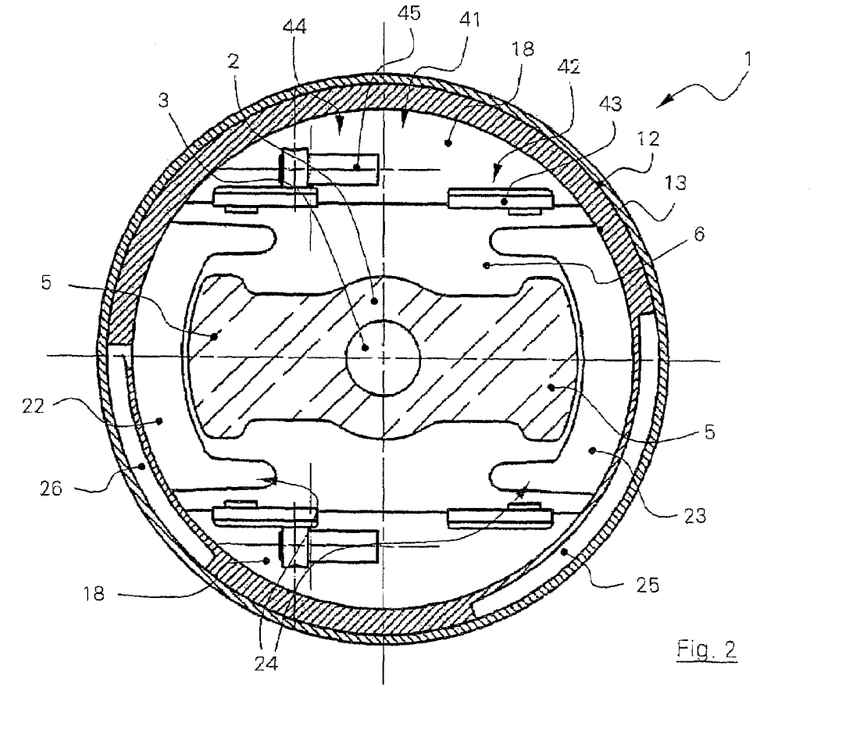
FIG. 2 is a sectional view along section line II-II in FIG. 1 showing the outer sleeve and channel carrier.
Figure 3:
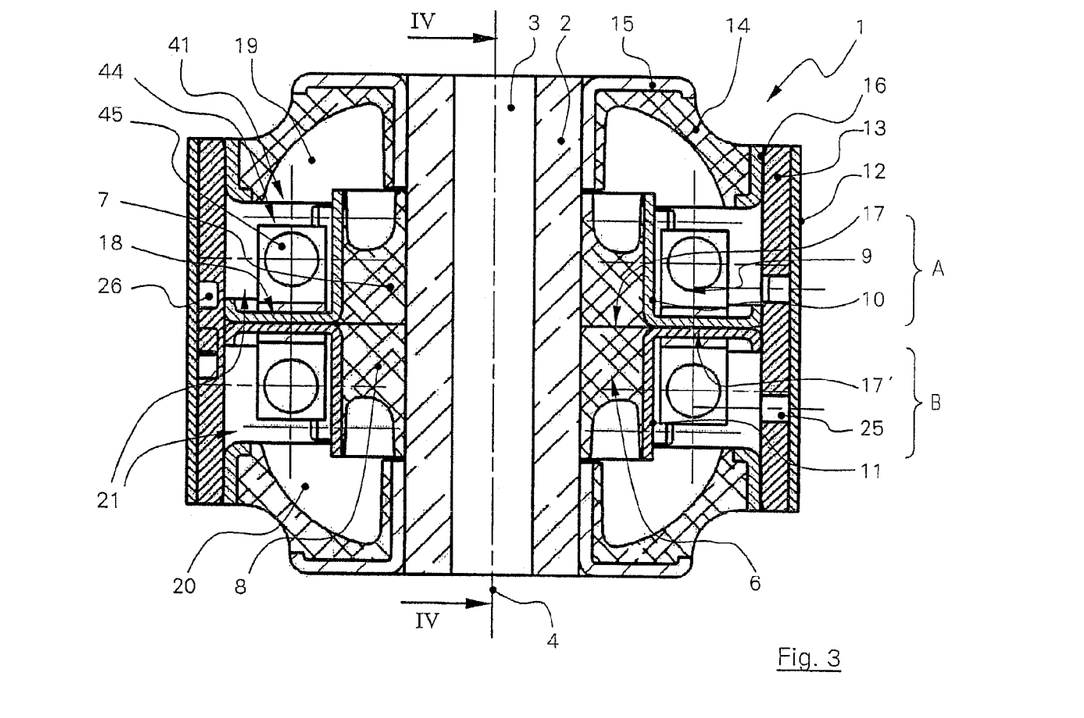
FIG. 3 is a sectional view along section line III-III in FIG. 1 showing the outer sleeve and channel carrier.
Figure 4:
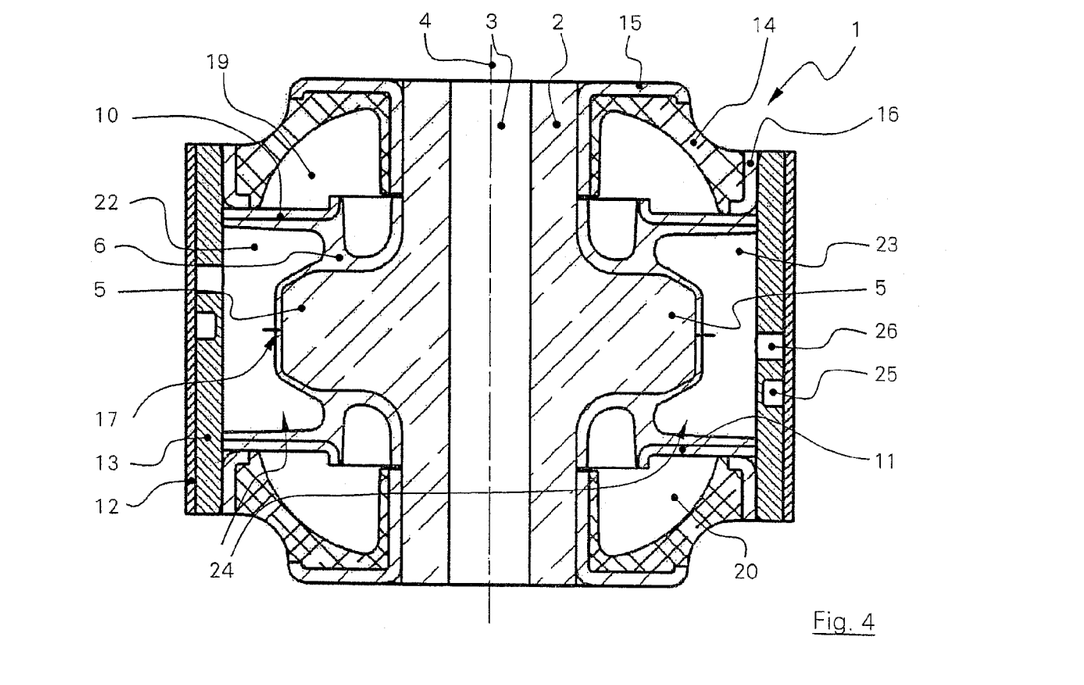
FIG. 4 is a sectional view along section line IV-IV in FIG. 3.
Figure 5:
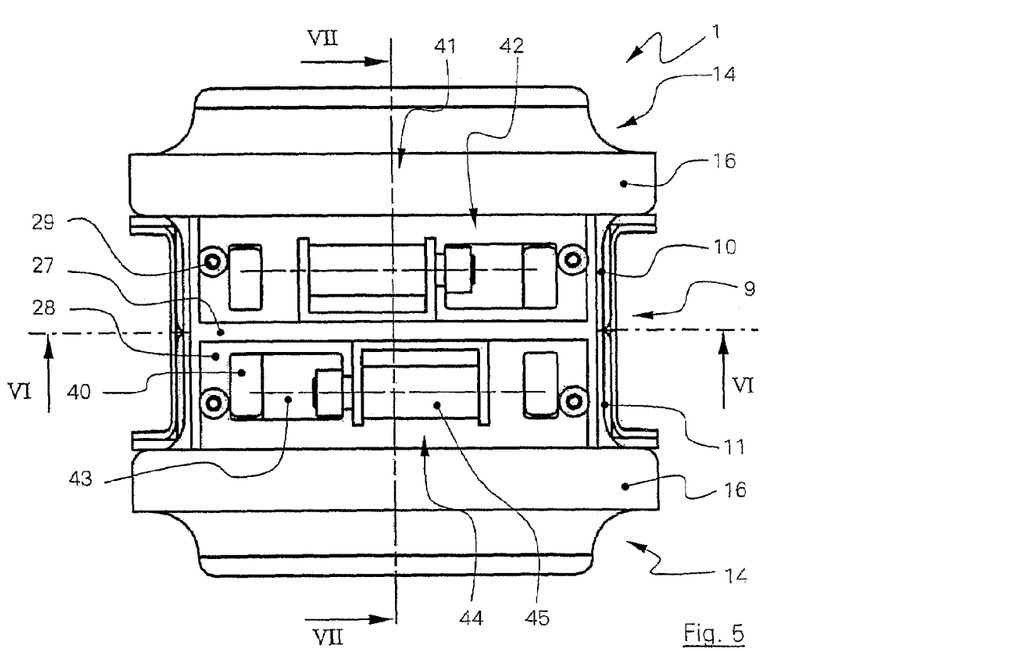
FIG. 5 is a side view of a second embodiment of the bush bearing according to the present invention without outer bush and channel carrier showing the outer sleeve and channel carrier.
Figure 6:
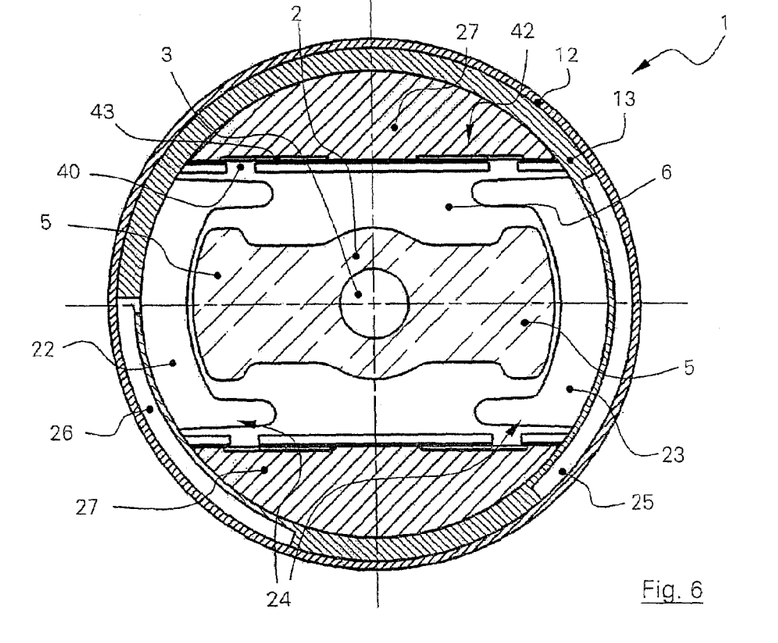
FIG. 6 is a sectional view along section line VI-VI in FIG. 5.
Figure 7:
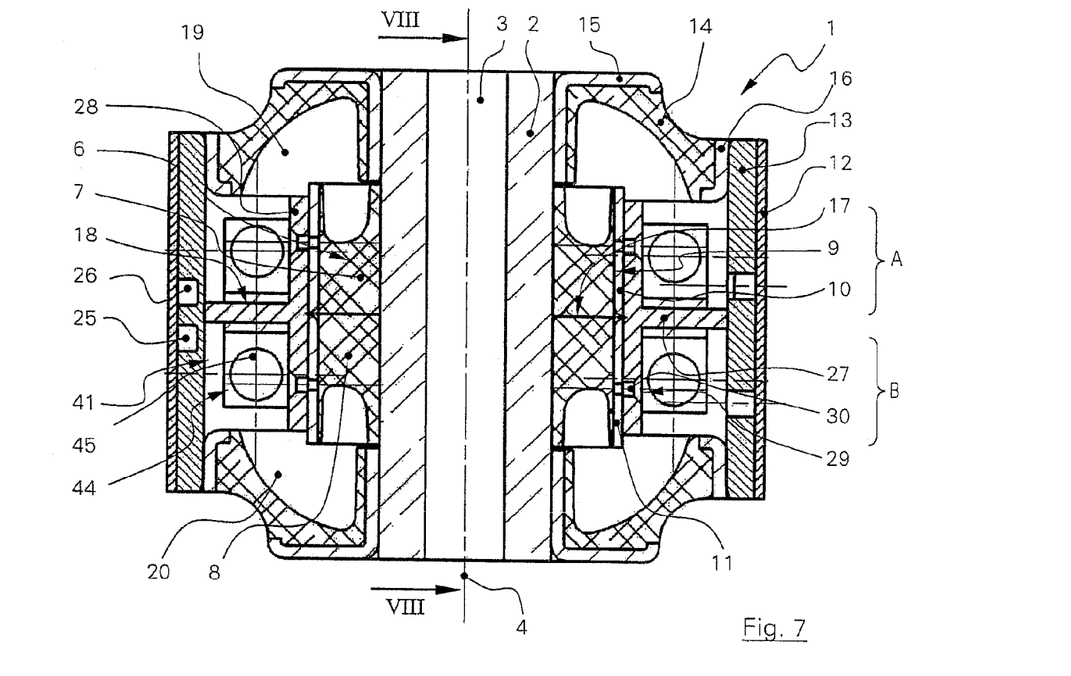
FIG. 7 is a sectional view along section line VII-VII in FIG. 5.
Figure 8:
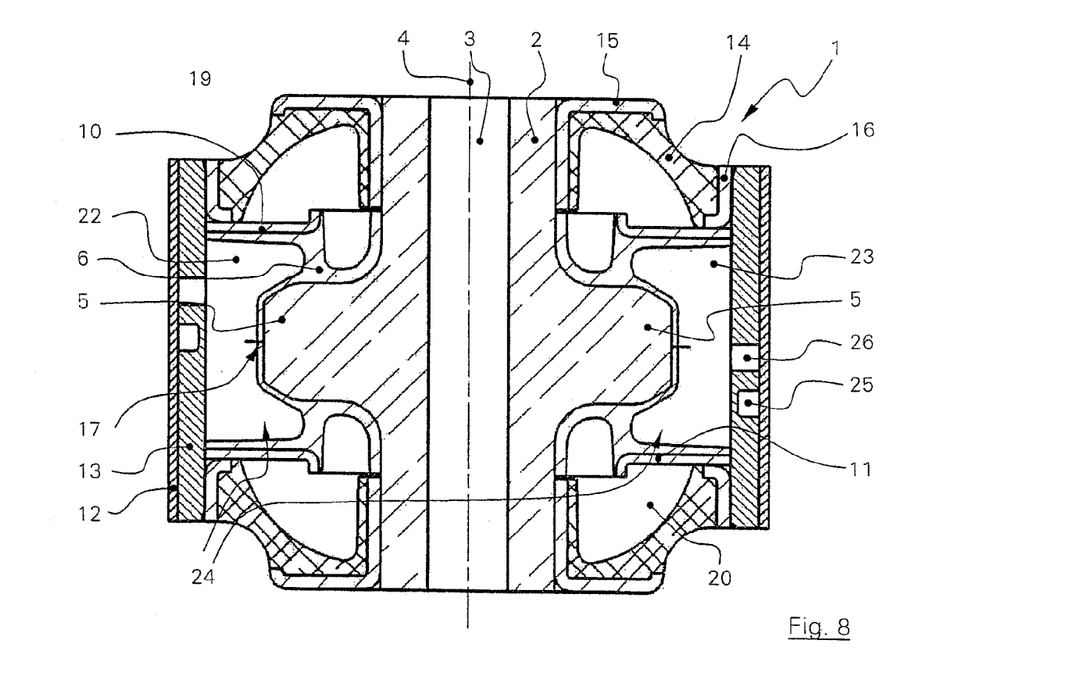
FIG. 8 is a sectional view along section line VIII-VIII in FIG. 7.

The upper and lower damping parts form, in their contact area, a parting plane 17, which is located in a common plane with the contact zone 17' of the upper and lower outer sleeve parts 10, 11. In the lateral area of the projections 5 of the inner part 2, the outer sleeve 9 is located at a spaced location from the outer bush 12 and the channel carrier 13. Approximately in the center of the bush bearing 1, the outer sleeve 9 is therefore provided with a web 18, which represents the connection between the outer sleeve 9 and the outer bush 12 or the channel carrier 13. In a top view, the web 18 is seen as a segment of a circle (FIG. 2). Like the outer sleeve as a whole, the web 18 also has a two-part design in this exemplary embodiment, so that the contact zone 17' continues into the web 18.

Together with the elastomeric damping member 6 as well as the outer sleeve 9 and, as a radial limitation, with the channel carrier 13 or the outer bush 12, the rubber bearings 14 arranged at the axial ends form an upper and a lower chamber 19, 20 each, which form a first chamber pair 21, which is separated from one another by the web 18 in the area of the parting plane 17. In the radially outer area of the projections 5, depressions prepared in the elastomeric damping member 6 form, together with the outer bush 12 and the channel carrier 13, two radial chambers 22, 23, which form a second chamber pair 24. The chambers 19, 20, 22 and 23 are filled with a hydraulic fluid.

Figure 9:
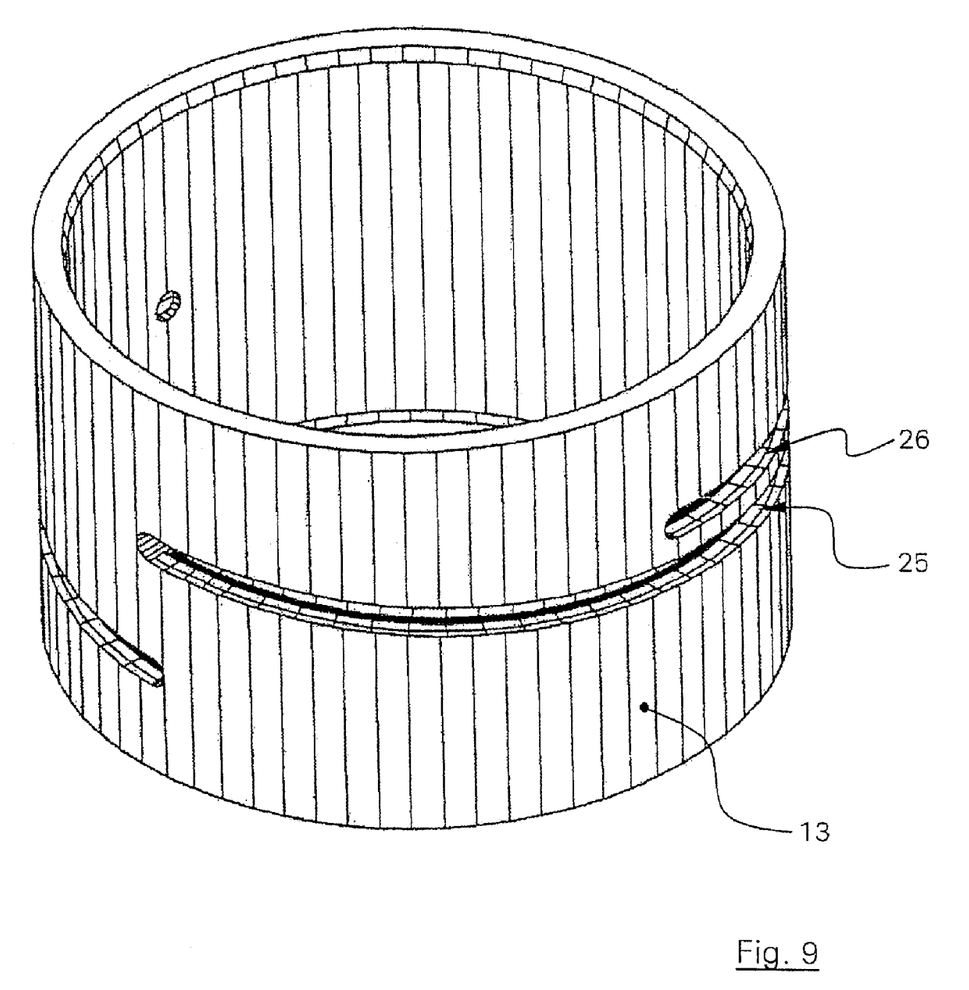
FIG. 9 is a three-dimensional view of the channel carrier for the above embodiments, shown as an individual component.

The two chambers 19, 20 of the first chamber pair 21 are connected to one another via a first damping channel 25 arranged in the channel carrier 13, and the two chambers 22, 23 of the second chamber pair 24 are connected to one another via a second damping channel 26, which is likewise arranged in the channel carrier 13 (cf. FIG. 9). The first chamber pair 21 thus forms a damping of the bush bearing 1 axially in relation to the longitudinal axis 4, whereas the second chamber pair 24 brings about a radial damping action of the bush bearing 1. The arrangement of the damping channels 25, 26 in a radially outer area of the bush bearing 1 makes possible great, freely selectable variation of the design of the damping channel volume to affect the damping properties of the bush bearing 1.

The channel carrier 13 extends in the axial direction over the entire length of the outer bush 12 in the embodiment shown. On the one hand, the possibilities of arrangement of the damping channels are expanded hereby, and, on the other hand, the channel carrier 13 supports the outer bush 12, because it can also participate in carrying mechanical loads acting on it. In another embodiment, it is absolutely conceivable to design the outer bush 12 and the channel carrier 13 as a common component. As an alternative, the channel carrier 13 may also be arranged radially outside the outer bush 12. Puncturing holes for the damping channels 25, 26 are now to be provided for this purpose in the outer bush 12.

The radially acting chambers 22, 23 of the second chamber pair 24 are not arranged over the entire circumference of the bush bearing 1, but only extend into a certain, limited section. Outside these areas, the radially acting chambers 22, 23 are surrounded by the axially acting chambers 19, 20, so that the chambers 19, 20 of the first chamber pair 21 and the chambers 22, 23 of the second chamber pair 24 overlap in partial areas A, B that are axial (extend in an axial direction) to the longitudinal axis 4. Thus, at least part of the volume of the axially acting chambers 19, 20 is displaced into central areas of the bush bearing 1, as a result of which a highly compact bush bearing 1 is obtained. The compact design is supported by the fact that the axially acting chambers 19, 20 are arranged such that they are separated from one another only by the web 18. The axially acting chambers 19, 20 are also located along a plane parallel to the longitudinal axis 3 directly adjacent to the radially acting chambers 22, 23, and this plane may also definitely be inclined in relation to the longitudinal axis 3. The axially acting chambers 19, 20 are separated from the radially acting chambers 22, 23 only by an area of the outer sleeve 9 or an area of the upper or lower outer sleeve part 10, 11 as well as a thin layer of the elastomeric damping member 6.

Chamber wall openings 40, which can be closed by a closing mechanism 41 as desired, are provided in the outer sleeve 9 and the elastomeric damping member 6 in the area where the axially acting chambers 19, 20 are arranged directly adjacent to the radially acting chambers 22, 23. The closing mechanism 41 comprises essentially a closing element 42, which is designed as a slide 43 in this exemplary embodiment, and an actuating device 44. The actuating device 44 is designed as an electromagnet 45 in this embodiment, but it may also have any other desired design. For example, it is also possible to use a closing element 42 that can be actuated pneumatically, hydraulically or mechanically by means of a pulling cable. The actuating device 44 in the exemplary embodiment being shown actuates two slides 43 each, as a result of which little space is needed for installation. The arrangement of the entire closing mechanism 41, including the actuating device 44, within the respective chamber 19 and 20 leads, in particular, to a bush bearing 1 of a compact design, without disturbing outwardly protruding components. Based on the space conditions, arrangement of the closing mechanisms 41 in the axially acting chambers 19 and 20 is suitable in the exemplary embodiment being shown. However, the closing mechanism 41 may also be accommodated, in principle, in the radially acting chambers 23 and 24, or a combination of arrangements is possible. In principle, an actuating device 44 may actuate one or any desired number of closing elements 42. This depends essentially on the arrangement of the chamber wall openings 40 as well as the space conditions in the bearing in general.

Depending on the driving conditions of a motor vehicle, the closing mechanisms 41 may release or close the chamber wall openings 40 as desired. If the chamber wall openings 40 are closed by the closing mechanisms 41, the fluid can be displaced in the respective damping channels 25 and 26 between the chambers 19, 20 of the first chamber pair 21 and between the chambers 22, 23 of the second chamber pair 24, so that damping action can be achieved. If, by contrast, the chamber wall opening 40 is opened, the fluid is exchanged between the chambers directly, without flowing, indirectly, over the damping channel 25 and/or 26. The damping action is abolished in this case.

All closing mechanisms 41 are actuated simultaneously via the associated actuating device 44 in the exemplary embodiment being shown. However, it is also possible to activate the actuating device 44 individually, in pairs or in groups, so that only the damping action in one direction of action may optionally be abolished, but it continues to be present in the other direction. When, for example, another closing mechanism (not shown) is provided at the web 18 between the axially acting chambers 19, 20, only the damping action in the axial direction can be abolished when this closing mechanism is controlled separately, whereas the damping action in the radial direction is preserved.

The two-part design of the outer sleeve 9 also makes simplified manufacture possible, besides the application of an advantageous pretension to the elastomeric damping member 6, as a result of which the manufacturing effort can be reduced. For example, the shrinkage strain introduced by the vulcanization operation can be reduced by the pretension on the elastomeric damping member 6 or on the upper and lower damping part 7, 8. As can be recognized from the figures, the elastomeric damping member 6 stresses a small volume only, as a result of which reduced use of material can be achieved.

The embodiment shown in FIGS. 5 through 8 differs from the embodiment described so far only in that the web 18, which was of a two-part design in the first exemplary embodiment, has been replaced by an element 27. The element 27 is in the form of a segment of a circle on both sides of the bush bearing 1 and has a fastening plate 28 standing at right angles to the parting plane 17. The element 27 is fastened to the outer sleeve 9 by means of a screw connection 29 with holes 30 arranged in the fastening plate 28. The additional element 27 and the fastening plate 28 are preferably made in one piece. As an alternative to the screw connection 29, the additional element 27 may also be fastened to the outer sleeve 9 by means of other types of connection, for example, by means of a clip connection or a riveted connection.

Secure fixation of the two outer sleeve parts 10, 11 to one another is created by means of the additional element 27 in order to make it possible to guarantee the pretension in the elastomeric damping member 6 at any time. Moreover, assembly is also simplified hereby, which leads to a further reduction of the manufacturing effort.

The use of an additional (single element replacing two part web 18) element 27 makes possible, moreover, a modular design, which minimizes the costs and the manufacturing effort, by the complete closing mechanism 41 comprising the closing element 42 and the actuating device 44 with the energy supply means being arranged at the additional element 27. An opening 46, which covers the chamber wall opening and is closed or released by a slide 43 as desired, is provided for this purpose in the fastening plate 29. The energy supply means may be designed, for example, as a cable duct or a plug connection passing through the elastomeric damping member.

The bush bearing 1 has a design symmetrical both radially and axially to the longitudinal axis 4. All essential components, such as the inner part 2, the elastomeric damping member 6, the outer sleeve 9, the rubber bearings 14 as well as the outer bush 12 are of a symmetrical design. Only the channel carrier 13 lacks perfect symmetry because of the formation of the damping channels 25, 26. The symmetry of the bush bearing 1 makes possible a uniform damping action in at least two directions in space. Moreover, the symmetry results in advantages in terms of design and manufacturing technology, which lower the manufacturing effort needed for manufacturing the bush bearing 1.

Moreover, the design of the bush bearing 1 makes possible the implementation of a modular system, because all essential components can be replaced by components of the same type possessing other properties. For example, the channel carrier 13 can be replaced with a channel carrier 13 with modified damping channels 25, 26 in a simple manner. In the same manner, the rubber bearing 14 can also be replaced or another inner part 2 can be used. The volume and the flexibilities of the axially and radially acting chambers 19, 20, 22 and 23 can be set especially by the use of different inner parts 2, elastomeric damping members 6 and/or rubber bearings 14 as well as different outer sleeves 9 in order to create different bearings with different damping properties.

While specific embodiments of the invention have been shown and described in detail to illustrate the application of the principles of the invention, it will be understood that the invention may be embodied otherwise without departing from such principles.

The invention claimed is:

1. A hydraulically damping bush bearing comprising:
   an inner part with a hole extending along a longitudinal axis;
   an outer sleeve surrounding said inner part;
   an elastomeric damping member arranged between said inner part and said outer sleeve;
   two chamber pairs including a first chamber pair with two separate chambers each filled with hydraulic fluid and a second chamber pair each filled with hydraulic fluid, wherein said two chambers of said first chamber pair are arranged axially along said longitudinal axis and said two chambers of said second chamber pair are arranged radially in relation to said longitudinal axis and are arranged between said two chambers of said first chamber pair in the axial direction of said longitudinal axis;
   a channel carrier, which connects said two chambers each of one of said chamber pairs to one another via at least one damping channel arranged in or at said channel carrier;
   an outer bush, which surrounds said elastomeric damping member, said outer sleeve, said channel carrier as well as said two chamber pairs, wherein at least one of said chambers of said first chamber pair is connected to at least one of said chambers of said second chamber pair via at least one closable chamber wall opening;
   a closing mechanism for closing said at least one said closeable chamber wall opening, said closing mechanism having a closing element with an actuating device, said actuating device actuating said closing element, said actuating device being arranged within one of said chambers.

2. A hydraulically damping bush bearing in accordance with claim 1, wherein said outer sleeve is located at a spaced location from said outer bush or from said channel carrier in at least one partial area, wherein in the area of the partial area located at a spaced location from said outer bush, said outer sleeve is in contact with said outer bush or with said channel carrier via at least one web, said web separating said chambers of said first chamber pair, said actuating device being arranged on said web.

3. A hydraulically damping bush bearing in accordance with claim 2, wherein said web is designed as an element, which connects said two outer sleeve parts to one another.

4. A hydraulically damping bush bearing in accordance with claim 3, wherein said element is connected to said outer sleeve or to said two outer sleeve parts by means of a non-positive or positive-locking connection.

5. A hydraulically damping bush bearing in accordance with claim 4, wherein said non-positive or positive-locking connection is designed as a screw connection.

6. A hydraulically damping bush bearing in accordance with claim 3, wherein said additional element forms a preassembled module with said actuating device and said closing element.

7. A hydraulically damping bush bearing in accordance with claim 1, wherein said outer sleeve has a two-part design comprising two said outer sleeve parts.

8. A hydraulically damping bush bearing in accordance with claim 7, wherein said two parts of said outer sleeve are symmetrical to one another.

9. A hydraulically damping bush bearing in accordance with claim 7, wherein:
   said elastomeric damping member has a two-part design comprising two elastomeric partial areas, wherein a contact area of said elastomeric partial areas is designed as a parting plane; and
   said two outer sleeve parts form a contact zone, which is located in a common plane with said parting plane of said elastomeric partial areas.

10. A hydraulically damping bush bearing in accordance with claim 1, wherein said channel carrier is arranged between said outer sleeve and said outer bush.

11. A hydraulically damping bush bearing in accordance with claim 10, wherein said channel carrier has a cylindrical shape and extends essentially over the entire extension of said outer bush, said extension being axial in relation to said longitudinal axis.

12. A hydraulically damping bush bearing in accordance with claim 1, wherein said element comprises a slide.

13. A hydraulically damping bush bearing in accordance with claim 12, further comprising another slide, wherein at least two said slides can be actuated by means of said actuating device.

14. A hydraulically damping bush bearing in accordance with claim 1, wherein said chambers of said first chamber pair and said chambers of said second chamber pair overlap at least in partial area that is axial in relation to said longitudinal axis.

15. A hydraulically damping bush bearing in accordance with claim 1, wherein said actuating device comprses an electromagnet.

16. A hydraulically damping bush bearing in accordance with claim 1, wherein said actuating device comprises a pneumatic, hydraulic or mechanical actuating device.

17. A hydraulically damping bush bearing in accordance with claim 1, further comprising another actuating device, wherein said actuating devices can be activated individually, in pairs or in groups.

18. A hydraulically damping bush bearing in accordance with claim 1, wherein said respective two chambers of said two chamber pairs are designed and arranged symmetrically in relation to one another.

19. A hydraulically damping bush bearing in accordance with claim 1, wherein said inner part has two projections, which are located opposite each other in the radial direction and are directed in the direction of said chambers of said second chamber pair.

20. A hydraulically damping bush bearing in accordance with claim 1, wherein said elastomeric damping member has a two-part design comprising two elastomeric partial areas, wherein the contact area of said elastomeric partial areas is designed as a parting plane.

21. A hydraulically damping bush bearing in accordance with claim 1, wherein at least in partial areas, said outer sleeve forms a fixed partition between a chamber of said chamber pair and a chamber of said second chamber pair.

22. A hydraulically damping bush bearing in accordance with claim 1, wherein said actuating device defines an edge of one of said chambers of said first chamber pair and an edge of one of said chambers of said second chamber pair.

23. A hydraulically damping bush bearing comprising:
an inner part defining a hole extending along a longitudinal axis;
an outer sleeve surrounding said inner part;
an elastomeric damping member arranged between said inner part and said outer sleeve;
a first pair of chambers with two separate first chambers each filled with hydraulic fluid;
a second pair of chambers with two separate second chambers each filled with hydraulic fluid, said two first chambers of said first pair of chambers being arranged axially along said longitudinal axis, said two second chambers of said second pair of chambers being arranged radially with respect to said longitudinal axis, said two second chamber of said second pair of chambers being located between said two first chambers of said first pair of chambers pair in an axial direction of said longitudinal axis;
a channel carrier including a first damping channel and a second damping channel, said first damping channel connecting one of said first chambers to another of said first chambers, said second damping channel connecting one of said second chambers to another of said second chambers;
an outer bush surrounding said elastomeric damping member, said outer sleeve, said channel carrier, said first pair of chambers and said second pair of chambers, said chambers of at least one of said pair of chambers being in communication via at least one closable chamber wall opening;
a closing mechanism for closing said at least one said closable chamber wall opening, said closing mechanism having a closing element with an actuating device, said actuating device actuating said closing element, said actuating device being arranged within one of said first chambers and said second chambers.

24. A hydraulically damping bush bearing in accordance with claim 23, wherein said outer sleeve is located at a spaced location from said outer bush or from said channel carrier in at least one partial area, wherein in the area of the partial area located at a spaced location from said outer bush, said outer sleeve is in contact with said outer bush or with said channel carrier via at least one web, said web separating said chambers of said first chamber pair, said actuating device being arranged on said web.

25. A hydraulically damping bush bearing in accordance with claim 23, wherein said actuating device defines an edge of one of said pair of chambers when said actuating device closes said at least one closable chamber wall opening.

26. A hydraulically damping bush bearing comprising:
an inner part defining a hole extending along a longitudinal axis;
an outer sleeve surrounding said inner part;
an elastomeric damping member arranged between said inner part and said outer sleeve;
two chamber pairs including a first chamber pair with two separate first chambers each filled with hydraulic fluid and a second chamber pair with two separate second chambers each filled with hydraulic fluid, said two first chambers of said first chamber pair being arranged axially along said longitudinal axis, said two second chambers of said second chamber pair being arranged radially relative to said longitudinal axis, said two second chambers of said second chamber pair being located between said two first chambers of said first chamber pair in an axial direction of said longitudinal axis;
a channel carrier including a first damping channel and a second damping channel, said first damping channel connecting one of said first chamber pair to another of said first chamber pair, said second damping channel connecting one of said second chambers of said second chamber pair to another of said second chambers of said second chamber pair;
an outer bush surrounding said elastomeric damping member, said outer sleeve, said channel carrier, said first chambers of said first chamber pair and said second chambers of said second chamber pair, wherein one of said first chambers of said first chamber pair is in communication with one of said second chambers of said second chamber pair via at least one closable chamber wall opening and another one of said first chambers of said first chamber pair is in communication with another one of said second chambers of said second chamber pair via another closable chamber wall opening; and
a closing mechanism for closing said at least one of said closable chamber wall openings, said closing mechanism having a closing element with an actuating device, said actuating device actuating said closing element, said actuating device being arranged within one of said first chambers and said second chambers.

27. A hydraulically damping bush bearing in accordance with claim 26, wherein said outer sleeve is located at a spaced location from said outer bush or from said channel carrier in at least one partial area, wherein in the area of the partial area located at a spaced location from said outer bush, said outer sleeve is in contact with said outer bush or with said channel carrier via at least one web, said web separating said chambers of said first chamber pair, said actuating device being arranged on said web.

28. A hydraulically damping bush bearing in accordance with claim 26, wherein said actuating device defines an edge of one of said first chambers and one of said second chambers when said actuating device closes one of said closable chamber wall openings.

* * * * *